United States Patent [19]
Choi et al.

[11] Patent Number: 5,982,466
[45] Date of Patent: *Nov. 9, 1999

[54] METHOD OF FORMING AN ALIGNMENT LAYER AND A LIQUID CRYSTAL CELL HAVING SAME USING PATTERNING BY LIGHT IRRADIATION

[75] Inventors: Yoo Jin Choi, Kyungki-do; Jin Hee Jung, Seoul, both of Rep. of Korea

[73] Assignee: LG Electronics Inc, Seoul, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/979,936

[22] Filed: Nov. 26, 1997

[30] Foreign Application Priority Data

Nov. 29, 1996 [KR] Rep. of Korea ............ 96-59811

[51] Int. Cl.[6] .................................................. G02F 1/1337
[52] U.S. Cl. ...................... 349/124; 349/153; 349/155
[58] Field of Search .................................. 349/124, 155, 349/123, 190, 153; 359/FOR 121, FOR 120

[56] References Cited

U.S. PATENT DOCUMENTS

| | | | |
|---|---|---|---|
| 4,341,445 | 7/1982 | Matsuyama et al. | 350/344 |
| 4,705,360 | 11/1987 | Funada et al. | 349/155 |
| 4,725,517 | 2/1988 | Nakanowatari et al. | 349/124 |
| 5,587,822 | 12/1996 | Lee | 349/124 |

*Primary Examiner*—James A Dudek
*Attorney, Agent, or Firm*—Morgan, Lewis & Bockius LLP

[57] ABSTRACT

A method of fabricating a liquid crystal cell comprises the steps of providing a substrate whose one surface is coated with an alignment material containing spacers by spin coating method, and patterning an alignment layer by irradiating a light to the selected part of the alignment material.

12 Claims, 9 Drawing Sheets

METHOD OF FORMING AN ALIGNMENT LAYER AND A LIQUID CRYSTAL CELL HAVING SAME USING PATTERNING BY LIGHT IRRADIATION

BACKGROUND OF THE INVENTION

The present invention relates to a method of fabricating a liquid crystal cell, and more particularly to a method of fabricating a liquid crystal cell wherein an alignment layer is patterned by irradiating an ultraviolet light into the selected part of an alignment material coated on a substrate so that a sealant may be properly printed on the substrate.

Liquid crystal molecules must be appropriately aligned to obtain a high contrast ratio and uniform brightness of a liquid crystal display. Alignment is achieved by rubbing two alignment layers which are coated on the opposing surface of two substrates, and in order to maintain the gap between the two substrates to a specified value, a spacer is deposited in a spraying operation in which static electricity assists the bonding of the to the substrate. After depositing the spacer, the substrates are sealed with a sealant and liquid crystal material is injected into the gap between the two substrates.

As the structure of liquid crystal molecules changes by an external applied voltage, the liquid crystal element obtained by the above described process can be used as a optical device. The optical characteristic of the LC element depends on the cell gap and the alignment uniformity.

Figure 1A:
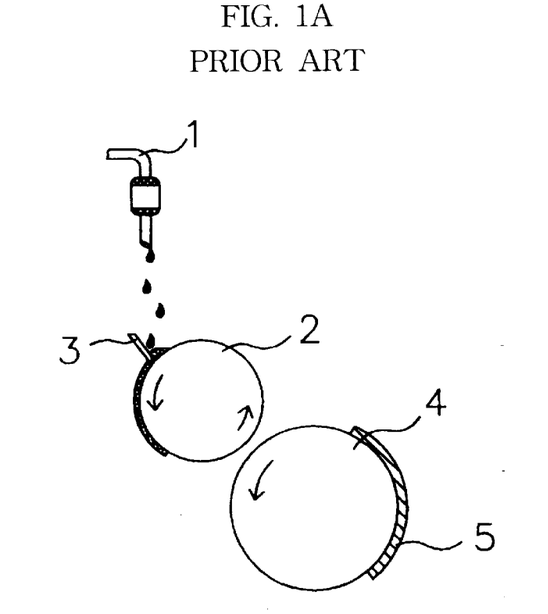
FIGS. 1A–1F are views showing the method of forming an alignment layer on a substrate by roll coating.
Figure 1B:
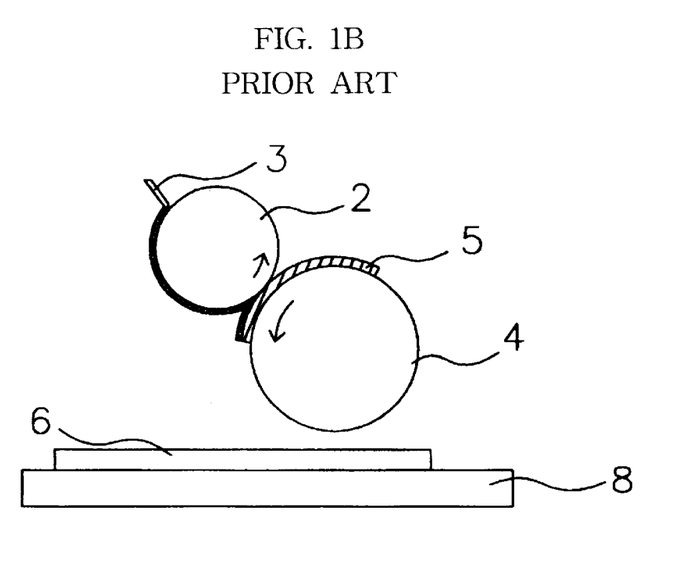
Figure 1C:
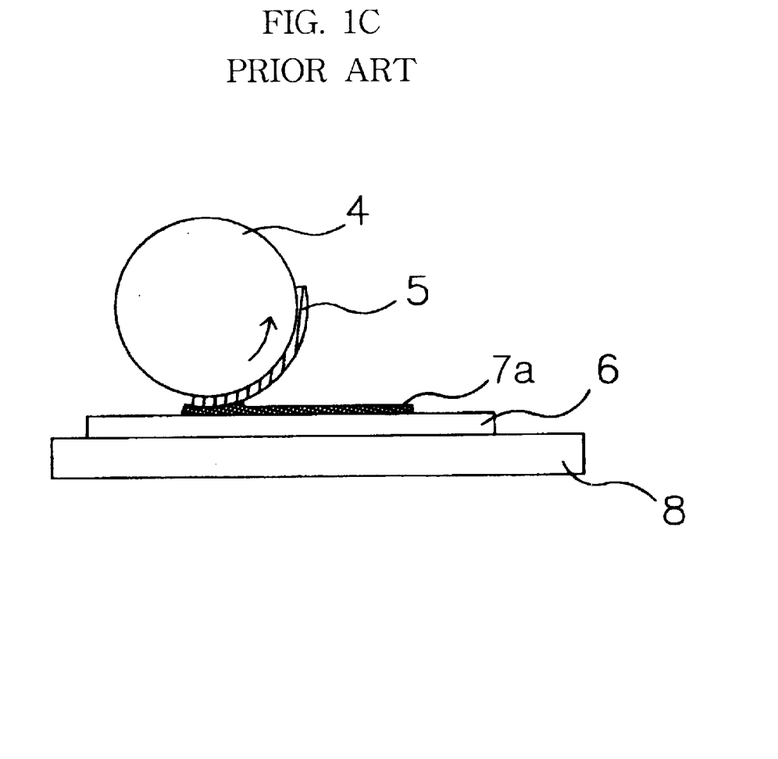
Figure 1D:
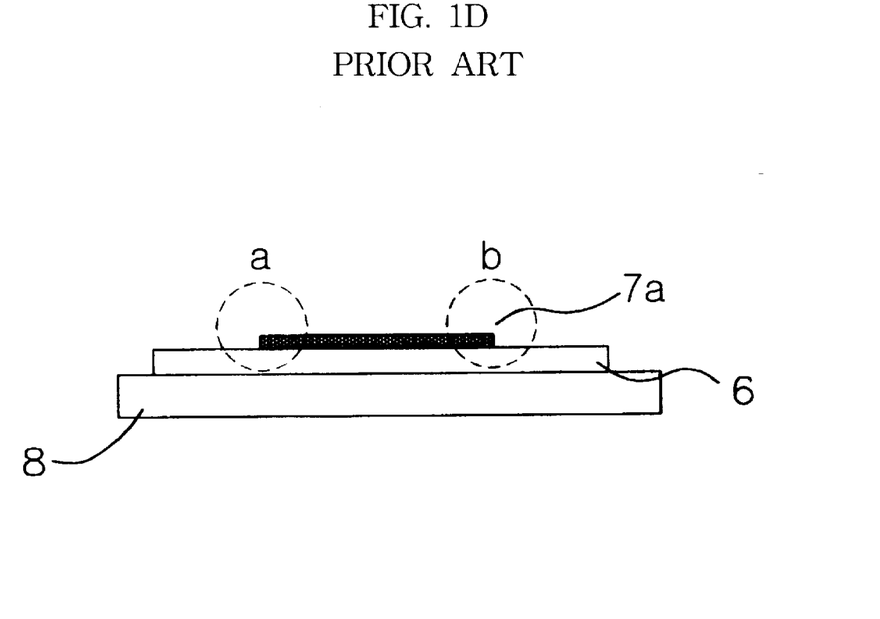
Figure 1E:
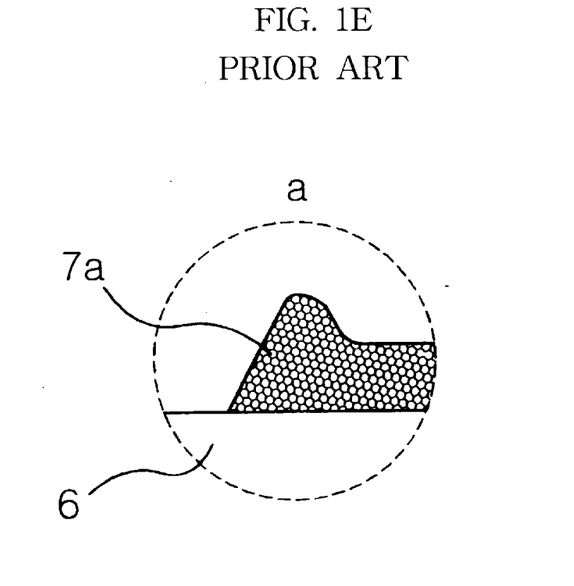
Figure 1F:
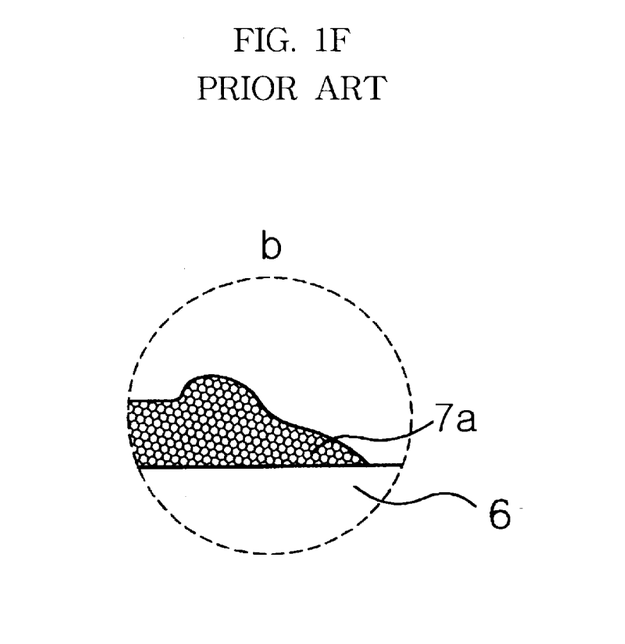

FIGS. 1A–1F show a conventional process of forming an alignment layer on a substrate surface by roll coating. As shown in FIG. 1A, an alignment material is provided to the gravure roll 2 from the nozzle 1, and the alignment material is coated on the gravure roll 2 surface with a uniform thickness controlled by the doctor blade 3. Thereafter, as shown in FIG. 1B, the alignment material is rolled and moved onto the printing plate 5 which is formed on the surface of the printing roll 4. Then, as shown in FIG. 1C, the alignment material is rolled and coated onto the surface of a first substrate 6 which is laid on a moving plate 8. The thickness of the formed first alignment layer 7a as shown in FIG. 1D is controlled by the doctor blade 3, the concentration of the alignment layer forming material, and the pressure of the printing roll 4. Then, the first alignment layer 7a is baked and rubbed with a fabric in a chosen direction.

Figure 2A:
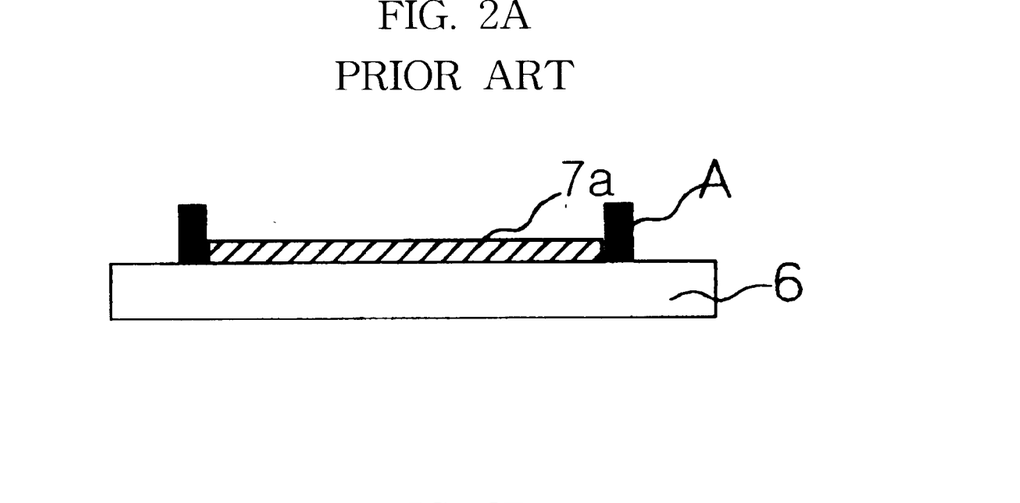
FIGS. 2A–2C are views showing the general method of assembling together two substrates.
Figure 2B:
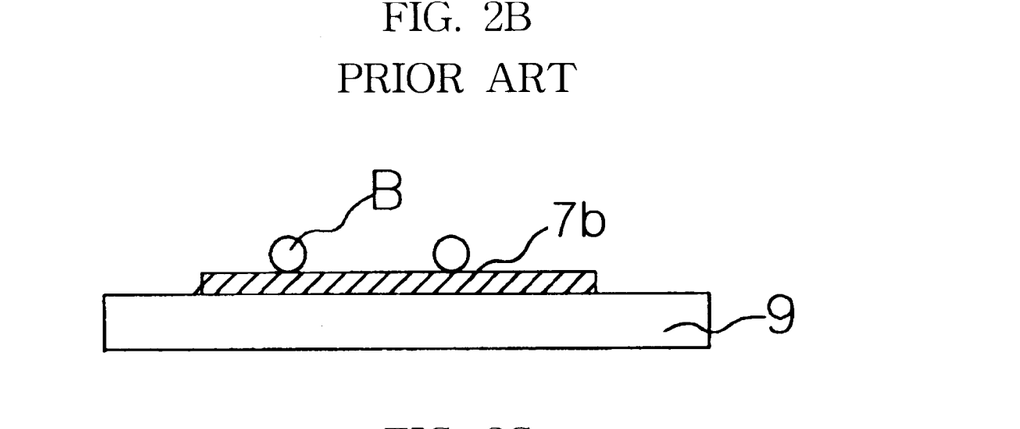
Figure 2C:
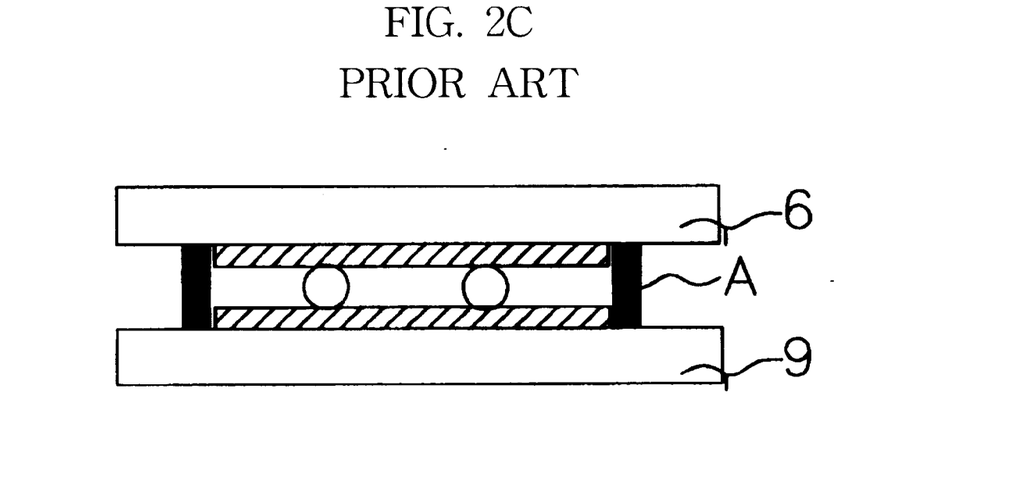

FIGS. 2A–2C show a conventional process of fabricating a liquid crystal cell. As shown in FIG. 2A, the first alignment layer 7a is applied on the first substrate 6 and a sealant A is printed on the first substrate 6. And, as shown FIG. 2B, a second alignment layer 7b is applied on a second substrate 9, and spacers B are deposited on the second substrate 9 to maintain a specified cell gap. Thereafter, as shown in FIG. 2C, the first and second substrates 6,9 are attached together. Then, the liquid crystal cell is obtained by injecting the liquid crystal into the gap between the two substrates 6,9.

In above mentioned method of forming an alignment layer, however, a part of the alignment material adhered onto the print plate is liable to be volatilized, and after coating the alignment layer on the substrate, a considerable amount of the alignment material remains attached to the print plate. Further, as shown in the FIG. 1E and FIG. 1F, the edges a,b of the alignment layer 7a coated on the first substrate 6 is deformed to cause an irregular alignment of liquid crystal molecules. Furthermore, the electrical interaction between the adjacent spacers causes disclination where the alignment of LC molecules is not defined.

In order to solve the above described problem of roll coating, the spin coating method can be performed, but because the alignment layer formed by the spin coating has a deformed outline, a sealant is liable to be formed on a part of the alignment layer, which can deteriorate the sealing property. Therefore, when a liquid crystal material is injected into the gap between the substrates, the liquid crystal material can leak out through the deteriorated sealing spot.

SUMMARY OF THE INVENTION

An object of the present invention is to provide a method of forming an alignment layer on a substrate on which a sealant is properly printed on the substrate.

In order to achieve the object, the method of forming an alignment layer comprises steps of coating an alignment material on the surface of a substrate, forming an alignment layer which is patterned by irradiating a light into the selected part of the alignment material and removing the part. The present invention is especially effective in being adopted to an alignment layer formed by spin coating method which is liable to cause the deformity of the outline of the alignment layer.

Another object of the present invention is to provide a method of forming a liquid crystal cell to prevent a liquid crystal material from leaking out of the liquid crystal cell in lamination process and to reduce to one step from the two steps of coating an alignment layer on a substrate and spraying spacers on the substrate.

In order to achieve the another object, the method of forming a liquid crystal cell comprises steps of providing a substrate whose one surface is coated with an alignment material which contains spacers, and patterning the alignment layer by irradiating an ultraviolet light to the selected part of the alignment material.

Patterning the alignment layer by light irradiation prevents a sealant from being printed on a part of the alignment layer, and the sealing property of the liquid crystal cell is improved. Furthermore, disclination caused by electrical interaction between the spacers are removed because the spacers is covered with the alignment layer.

DETAILED DESCRIPTION OF THE INVENTION

Now referring to the drawings, the method of forming a liquid crystal cell in accordance with the present invention are described below.

Figure 3A:
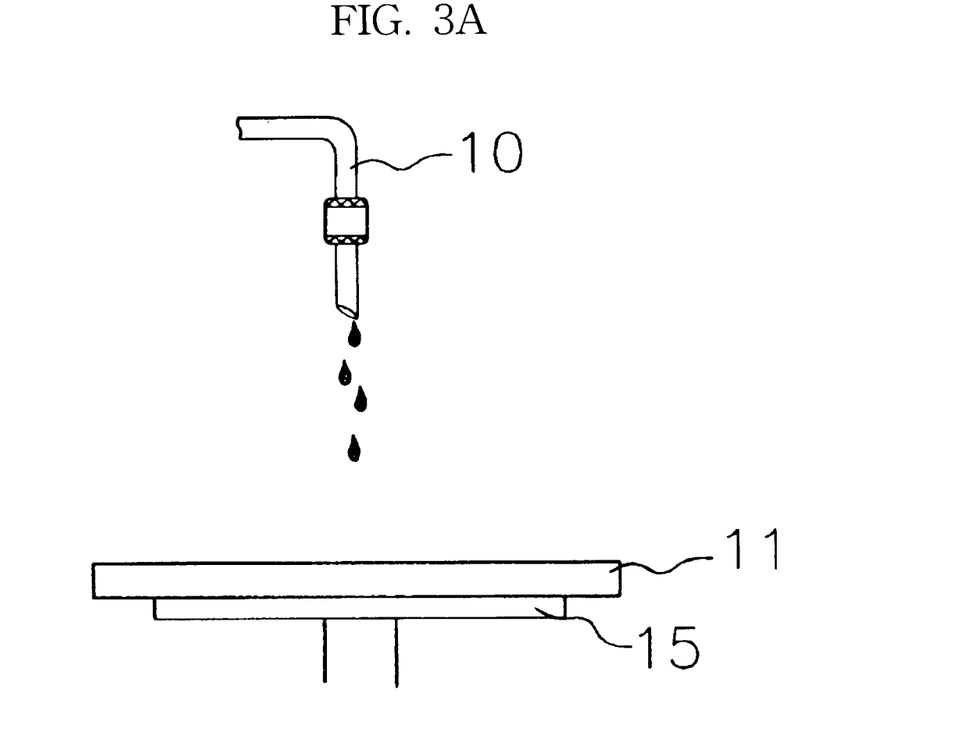
FIGS. 3A–3E are views showing the method of forming a first alignment layer on a first substrate in accordance with the present invention.
Figure 3B:
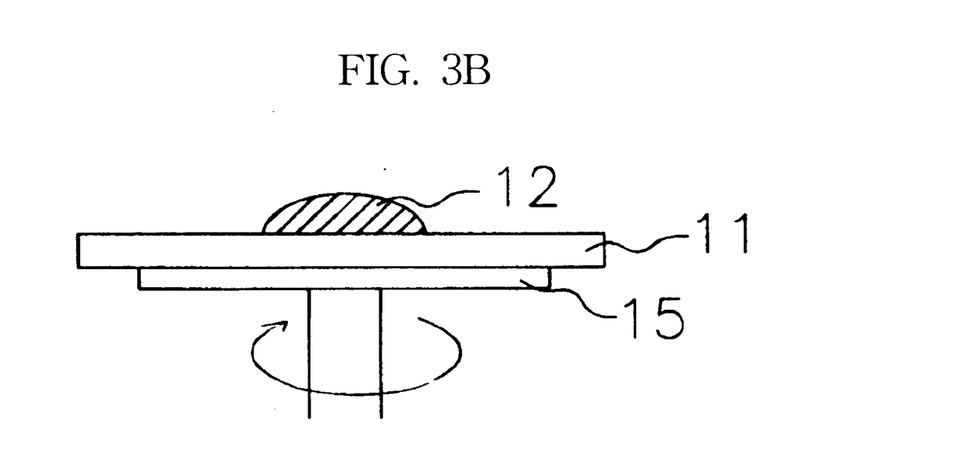
Figure 3C:
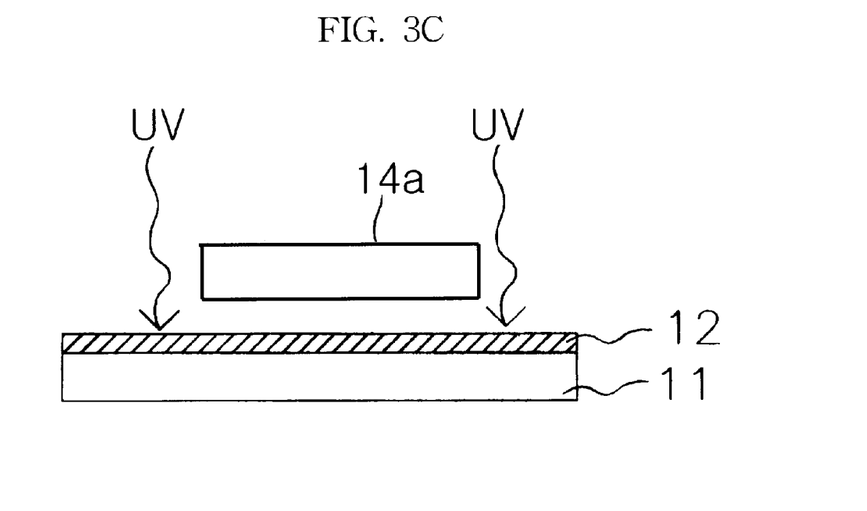
Figure 3D:
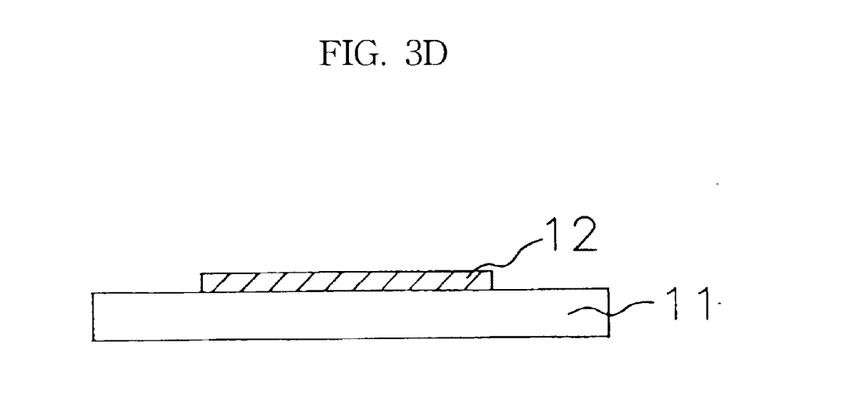
Figure 3E:
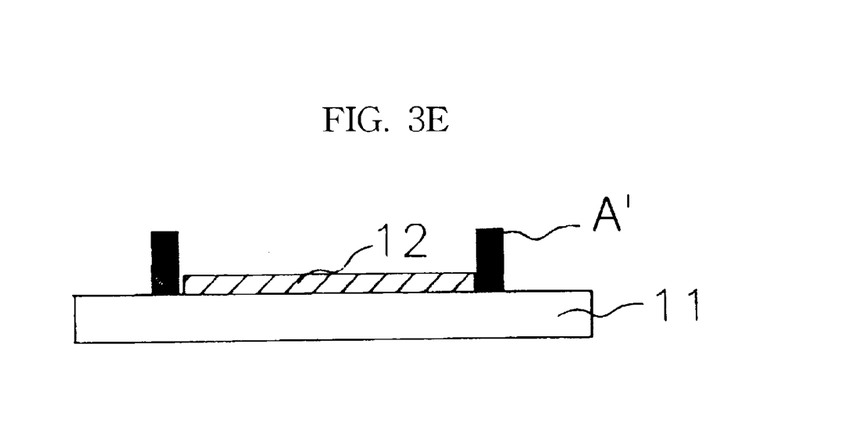

FIGS. 3A–3E show a method of forming a first substrate according to the present invention. First, as shown in FIG. 3A, a nozzle 10 provides an alignment layer to the first substrate 11 fixed on a spinning vacuum chuck 15. the amount of the alignment layer is controlled by a nozzle 10. Further, as shown in FIG. 3B, the alignment material 12 is expansively coated over the spinning substrate surface by the centrifugal force. Thereafter, as shown in FIG. 3C, a part of the first alignment layer 12 where a mask 14*a* is not covered is exposed to ultraviolet light and removed to form a first alignment layer 12 as shown in FIG. 3D, where the light irradiation disconnects the carbon chain of the alignment material. A mask 14*a* is used as a means for blocking the light. At this point, a preferred wavelength of the light is less than 300 nm. Then, as shown in FIG. 3E, a sealant A' is printed on the part of the first substrate 11 where the alignment material is removed. In this seal printing, the sealant A' is properly attached onto the first substrate 11 because the first alignment layer 12 is so patterned by means of the light irradiation.

That is, patterning the alignment layer by the light irradiation prevents the sealant from being printed on the alignment layer.

Figure 4A:
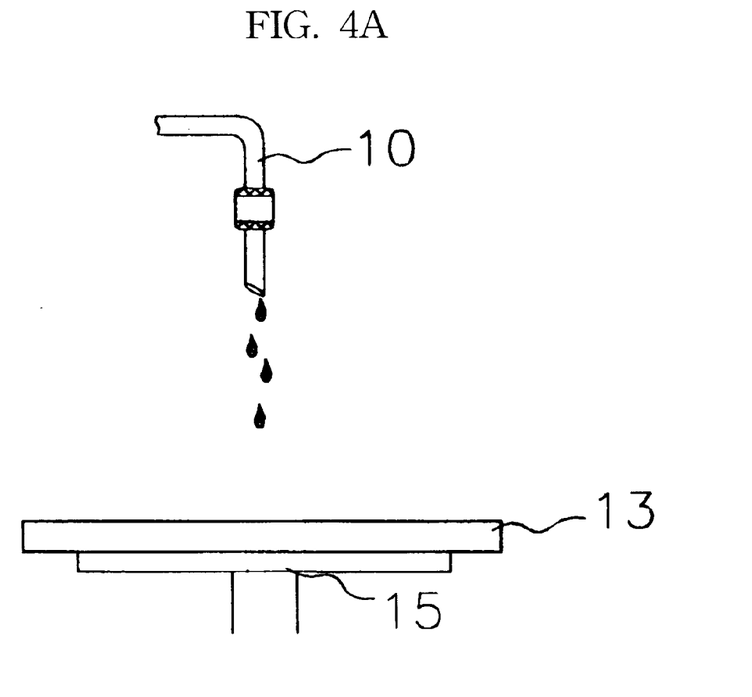
FIGS. 4A–4D are views showing the method of forming a second alignment layer on a second substrate in accordance with the present invention.
Figure 4B:
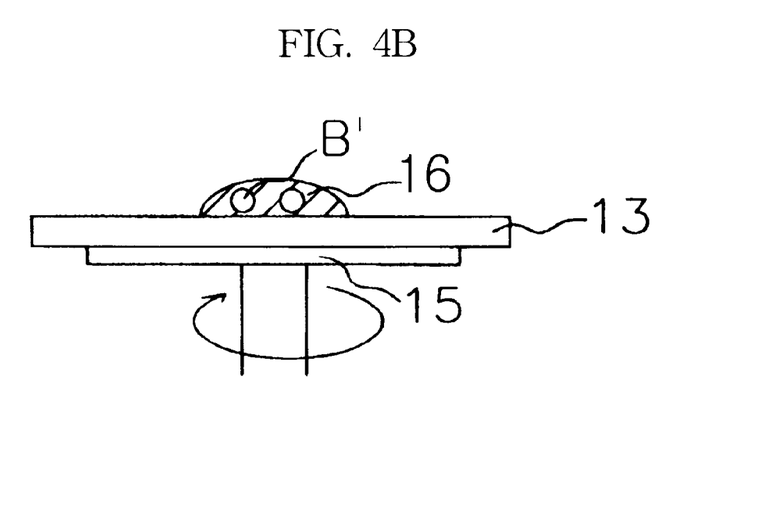
Figure 4C:
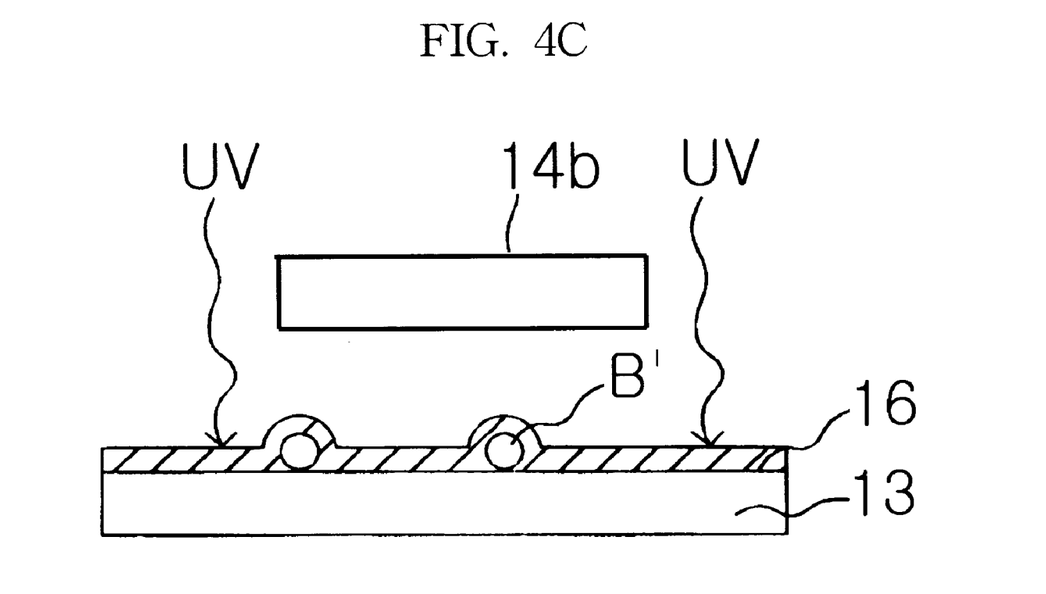
Figure 4D:
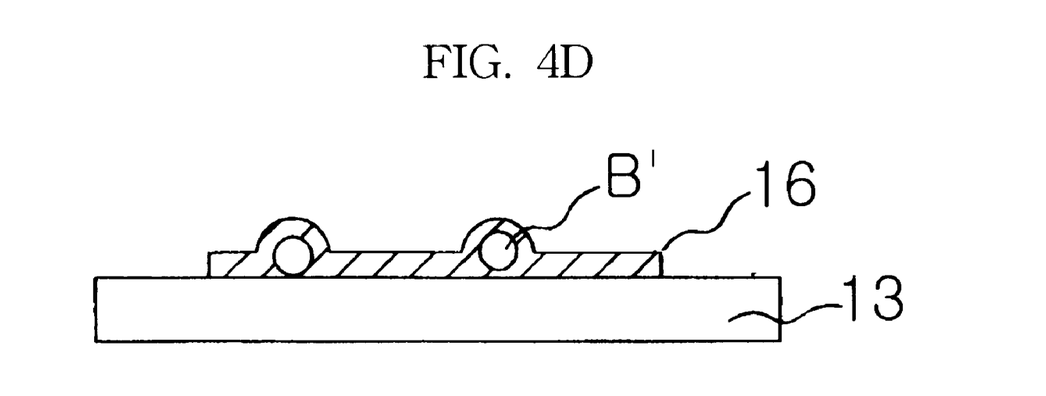

FIGS. 4A–4D show a method of forming a second substrate according to the present invention. First, as shown in FIG. 4A, a nozzle 10 provides an alignment material to the second substrate 13 fixed on spinning vaccum chunk 15. As shown in FIG. 4B, the alignment material 16 containing spacers B' is extensively coated over the second substrate surface by centrifugal force. Then, as shown in FIG. 4C, a part of the alignment material 16, where a mask 14*b* is not covered, is exposed to an ultraviolet light and eliminated to form a second alignment layer 16 as shown in FIG. 4D. Not only did the second alignment layer formed by the above mentioned method have a properly controlled pattern, but also prevents disclination which is caused by electrical interaction between the spacers because the spacers B are covered with the second alignment layer 16. In a viewpoint of fabricating method, two steps of forming a alignment layer and applying spacers are reduced to one step as described above with respect to FIG. 4B.

Figure 5:
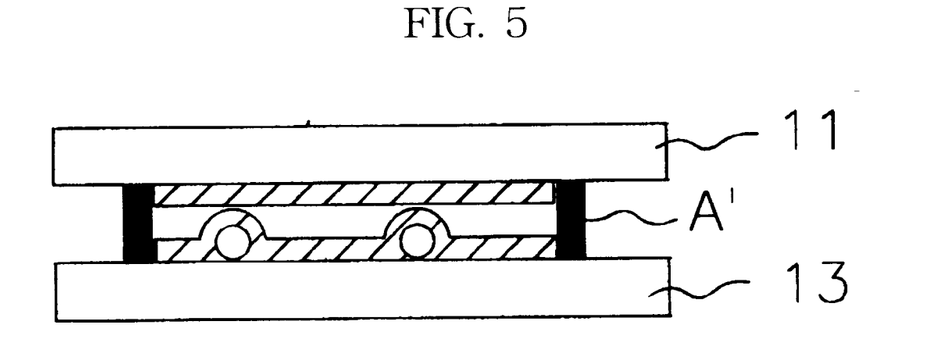
FIG. 5 is a view showing the method of assembling together the two substrates in accordance with the present invention.

FIG. 5 is view showing a LC cell formed by the method of the present invention. In order to fabricate the LC cell, the first substrate as shown in FIG. 3E and the second substrate as shown in FIG. 4D are brought into contact and the liquid crystal material is injected into the gap between the two substrates 11,13. The spacers B' smoothly coated by the second alignment layer 16 maintains a separation between the two substrates 11 and 13.

While the preferred form of the present invention has been described, it is to be understood that modifications will be apparent to those skilled in the art without departing from the spirit of the invention.

The scope of the invention, therefore, is to be determined solely by the following claims.

What is claimed is:

1. A method of forming an alignment layer, comprising the steps of:
    providing a substrate;
    coating an alignment material on the surface of the substrate;
    patterning a perimeter portion of the alignment material by irradiating the perimeter portion of the alignment material with light to form a first alignment layer; and
    forming a sealant around a perimeter of the first alignment layer at a position on the surface of the substrate irradiated with the light in the patterning step.

2. The method according to claim 1, wherein the alignment material is coated by a spin coating method.

3. The method according to claim 1, wherein the wavelengths of the light is less than 300 nanometers.

4. The method according to claim 1, wherein the patterning step is executed by blocking a portion of the light with a mask.

5. The method according to claim 1, wherein the perimeter portion of the alignment material is removed by the light irradiation.

6. The method according to claim 1, wherein the alignment layer includes spacers that are coated by the alignment material.

7. The method according to claim 1, wherein the forming step includes the step of printing the sealant on the substrate along the perimeter of the alignment layer.

8. A method of forming a liquid crystal cell, comprising the steps of:
    coating a surface of a first substrate with a first alignment material;
    patterning a perimeter portion of the first alignment material by irradiating the perimeter portion of the first alignment material with light to form a first alignment layer;
    forming a sealant around a perimeter of the first alignment layer at a position of the surface of the first substrate irradiated with the light in the patterning step;
    coating a surface of a second substrate with a second alignment material;
    patterning the second alignment material by irradiating a portion of the second alignment material with light to form a second alignment layer; and
    injecting a liquid crystal material into the gap between the first substrate and the second substrate.

9. The method according to claim 8, wherein the first and second alignment materials are coated by a spin coating.

10. The method according to claim 8, wherein the wavelength of the light is less than 300 nanometers.

11. The method according to claim 8, wherein one of the two alignment layers includes spacers that are coated by the corresponding one of the two alignment materials.

12. The method according to claim 8, wherein the forming step includes the step of printing the sealant on the first substrate along the perimeter of the first alignment layer.

* * * * *